United States Patent [19]

Duran et al.

[11] Patent Number: 5,284,408
[45] Date of Patent: Feb. 8, 1994

[54] ADJUSTABLE DIAMETER BOLT ASSEMBLY

[75] Inventors: John A. Duran, Glendora; Robert De Leon; Gordon Bussard, both of Burbank, all of Calif.

[73] Assignee: Avibank Mfg., Inc., Burbank, Calif.

[21] Appl. No.: 36,900

[22] Filed: Mar. 25, 1993

Related U.S. Application Data

[63] Continuation-in-part of Ser. No. 816,654, Jan. 3, 1992, Pat. No. 5,224,806.

[51] Int. Cl.$^5$ .................. F16B 13/04; F16B 13/06; F16B 35/02
[52] U.S. Cl. .................................. 411/33; 411/55; 411/348; 411/383
[58] Field of Search ................ 411/32, 33, 50, 51, 411/53, 55, 348; 403/408.1

[56] References Cited

U.S. PATENT DOCUMENTS

| | | | |
|---|---|---|---|
| 2,747,428 | 5/1956 | Peter et al. | 411/33 X |
| 3,192,820 | 7/1965 | Pitzer | 411/33 |
| 4,507,034 | 3/1985 | Lew et al. | 411/33 X |
| 5,193,956 | 3/1993 | Duran | 411/33 |

FOREIGN PATENT DOCUMENTS

53-62057 6/1978 Japan .................. 411/33

Primary Examiner—Neill R. Wilson
Attorney, Agent, or Firm—Poms, Smith, Lande & Rose

[57] ABSTRACT

A self-retaining adjustable diameter bolt assembly including a bolt having a head, a shank, and a threaded end adapted to be inserted into aligned holes in a pair of abutting panels for subsequent coupling to a nut on the blind side of the panels. The bolt includes a pawl engaging one side of the panel in which the bolt is inserted with the head thereof on the opposite side of the panels. A plurality of bushing segments are mounted on the bolt shank, the pawl extending through an opening in the segment adjacent the threaded end of the bolt shank and retained therein by engagement with a slot through the segment while simultaneously being oriented in an operative position therein. A nut, having a skirt portion, is threaded onto the threaded end driving the segments forward and filling the spacing between the holes and the bolt shank. The skirt portion of the nut overlies the pawl and protects the same. The nut can be fully torqued to cause complete radial expansion of the bushing segments in the aligned panel holes before bottoming out against the panels.

33 Claims, 4 Drawing Sheets

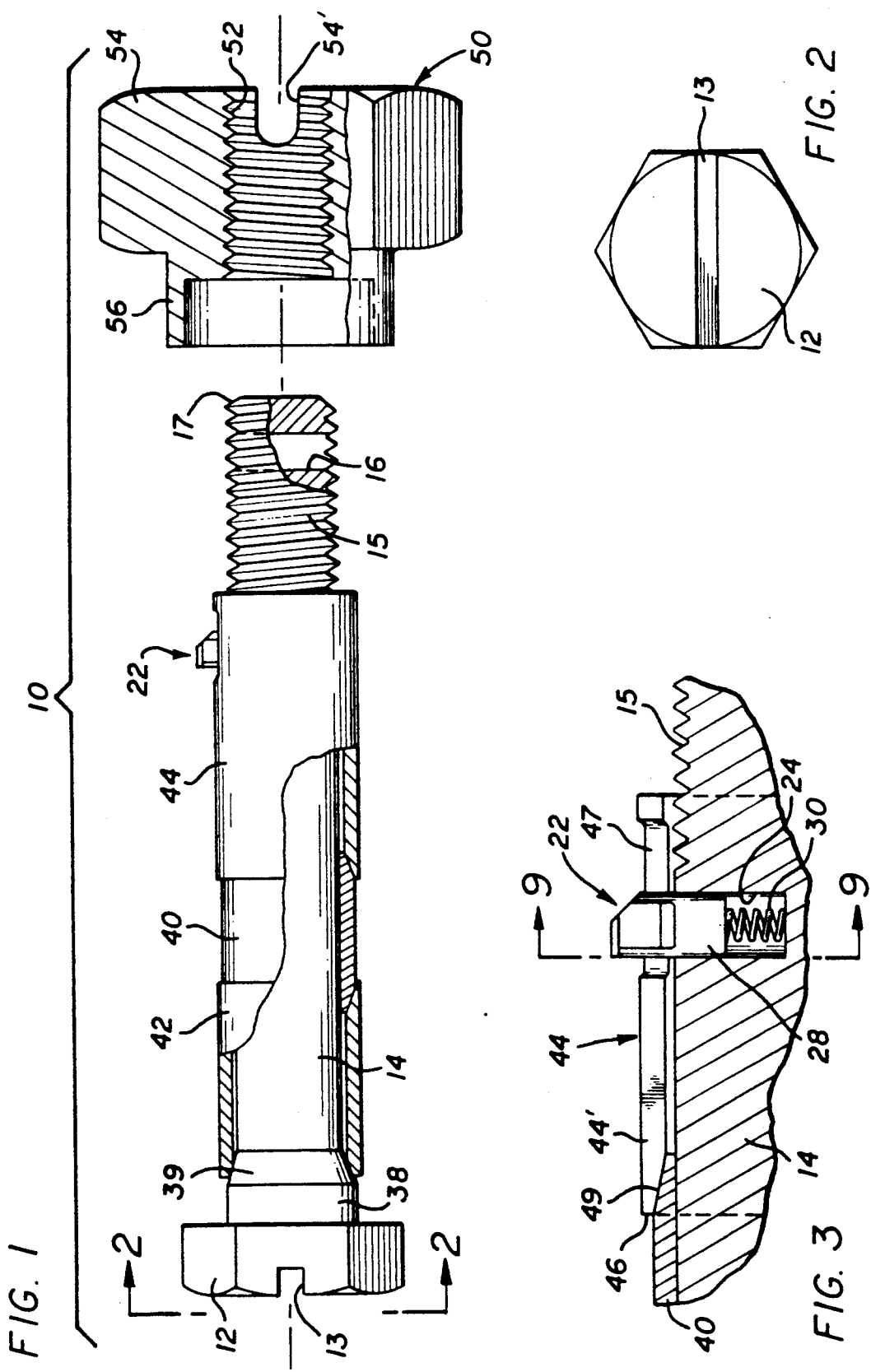

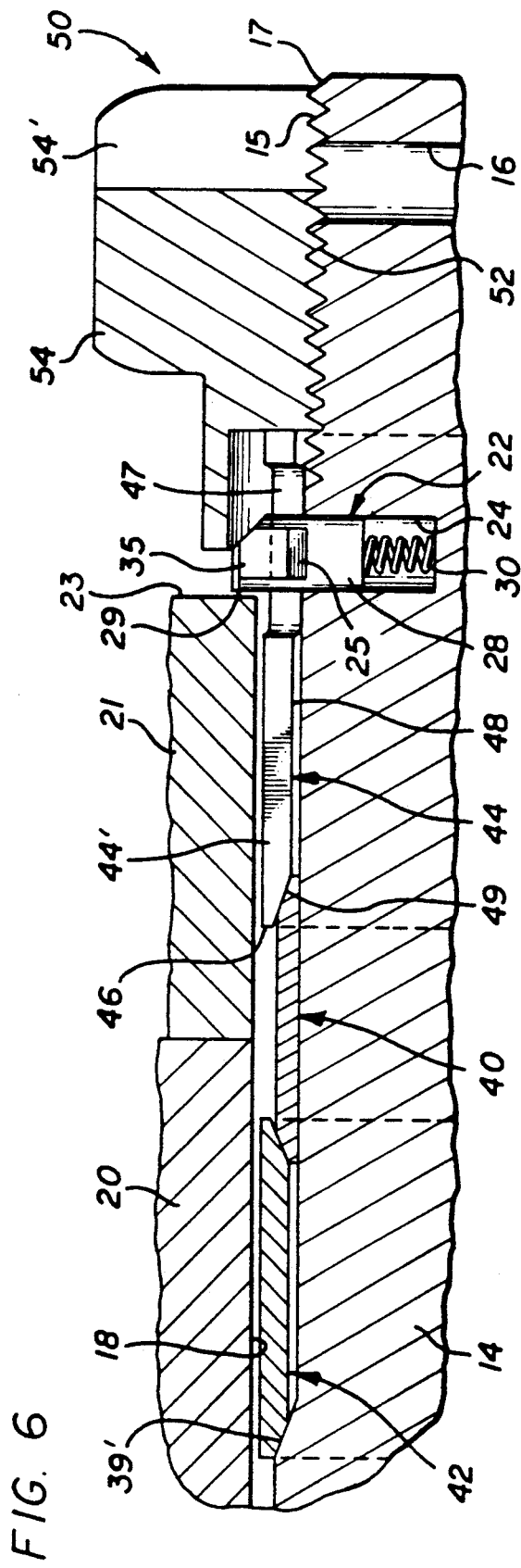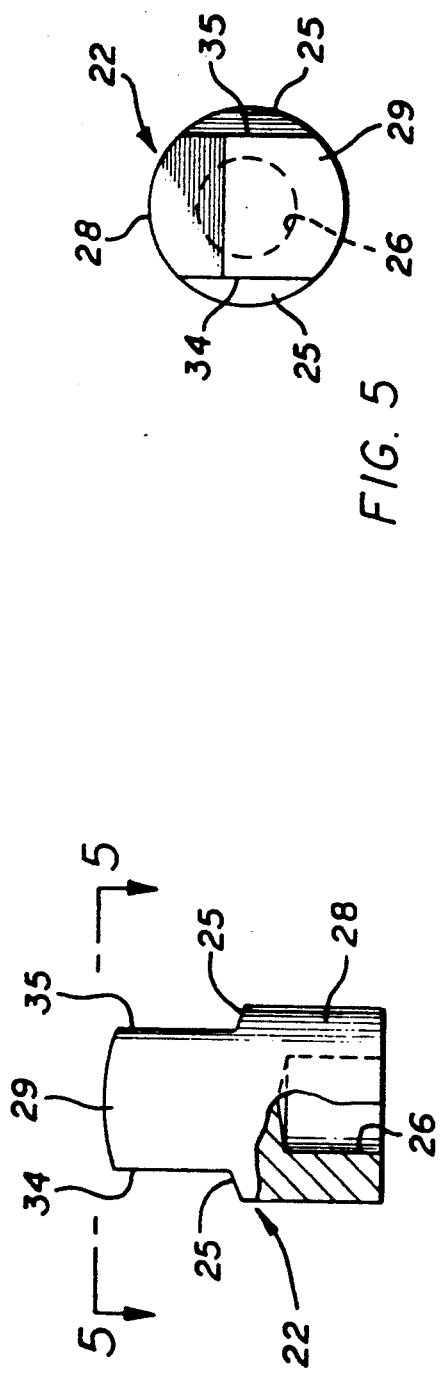
FIG. 6
FIG. 5
FIG. 4

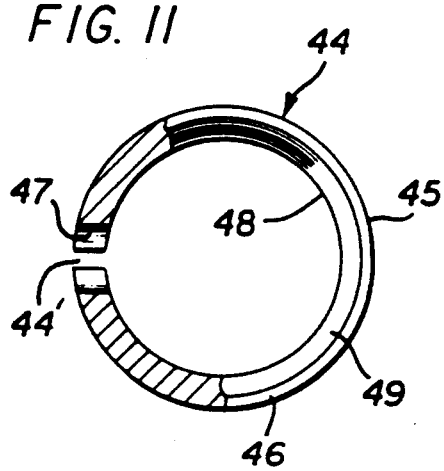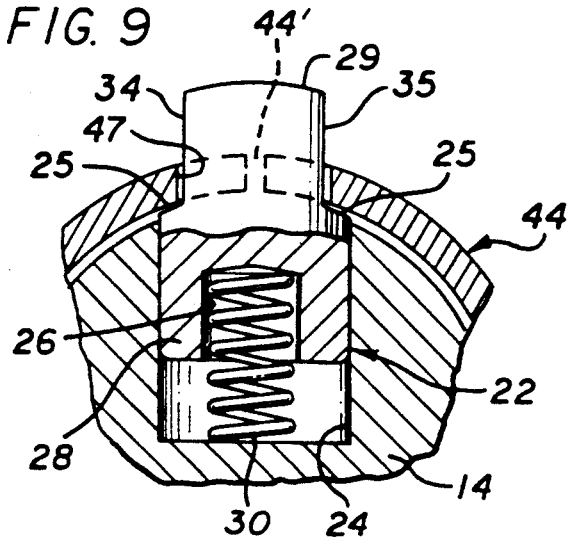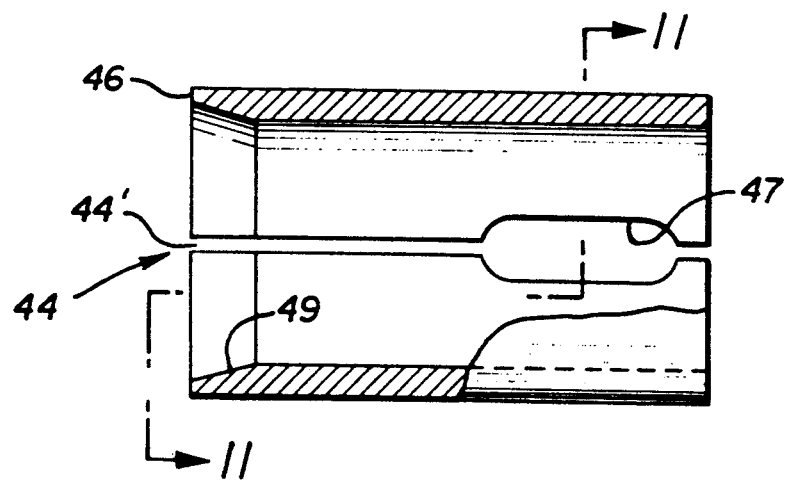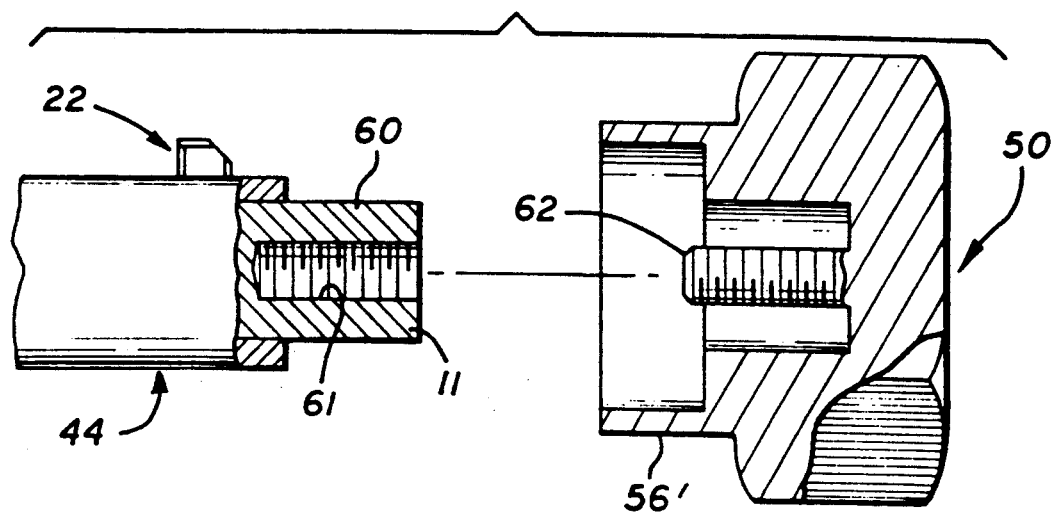

ADJUSTABLE DIAMETER BOLT ASSEMBLY

CROSS-REFERENCE TO RELATED APPLICATIONS

This application is a continuation-in-part of application Ser. No. 07/816,654, filed Jan. 3, 1992, now U.S. Pat. No. 5,224,806, commonly assigned.

BACKGROUND OF THE INVENTION

1. Field of the Invention

The invention relates to self-retaining bolt assemblies; and, more particularly, to an adjustable diameter bolt assembly for use in aircraft and other similar installations.

2. Description of the Prior Art

Self-retaining bolts are well known in the aircraft industry. Such bolts are mounted in one panel and adapted to be selectively coupled to and disengaged from a mating member mounted in an adjacent panel. Such prior art bolts include means thereon for retaining the bolt to the panel in which it is installed so that it can't fall out during vibration or the like even if it is not connected to its mating member and for allowing subsequent easy release therefrom. One type of prior art bolt is disclosed in U.S. Pat. No. 4,759,671. In this patent, a self-retaining bolt is disclosed having means for retaining the bolt to the panel in which it is installed without weakening the bolt while permitting easy release therefrom. Such means is easy to manufacture and install, require relatively few working parts and does not require orientation in a fixed direction for assembly.

However, the holes in the panels in which such bolts are installed vary in internal diameter. It is difficult to provide a bolt having a shank diameter that tightly fits in all such panel holes. There is thus a need for filling the spacing between the bolt shank and the hole walls of the panel in which the bolt is installed. Bushing segments are known which are used to fill such spacing, such as those disclosed in U.S. Pat. No. 3,192,820 to Pitzer. In U.S. Pat. No. 3,192,820 to Pitzer, there is disclosed a quick release pin having a plurality of male and female rings or bushings which, when compressed axially as a result of a compressive force applied to one end of the bushings, forces the male rings to contract and the female rings to expand to assume a larger diameter. That is, the effective diameter of the quick release pin can be increased after the pin is installed in a hole or opening in an installation. In like manner, the effective diameter of the pin can be reduced (or returned to its original diameter) when it is desired to remove the pin from the installation. There is a need for applying such bushing segments to a self-retaining bolt, as disclosed in U.S. Pat. No. 4,759,671, while protecting the pawl during the torquing of the bushing segments. In pending U.S. patent application Ser. No. 07/816,654, filed Jan. 3, 1992, commonly assigned, there is discussed a self-retaining adjustable diameter bolt assembly including a bolt having a head, a shank, and a threaded end adapted to be inserted into aligned holes in a pair of abutting panels for subsequent coupling to a nut on the blind side of the panels. The bolt includes a pawl engaging one side of the panel in which the bolt is inserted with the head thereof on the opposite side of the panels. A plurality of bushing segments are mounted on the bolt shank, the pawl extending through an opening in the segment adjacent the threaded end of the bolt shank. A nut, having a skirt portion, is threaded onto the threaded end driving the segments forward and filling the spacing between the holes and the bolt shank. The skirt portion of the nut overlies the pawl and protects the same. The nut can be fully torqued to cause complete radial expansion of the bushing segments in the aligned panel holes before bottoming out against the panels.

In this assembly, the bushings must be manufactured to exact tolerances and are thus costly to manufacture. There is a need for reducing the number of bushings while retaining the inventive features disclosed in the pending application. Further, in the assembly in the pending application, the bushing segment 44 therein through which pawl 22 protrudes must be peened about the opening in segment 44 surrounding pawl 22 to prevent its withdrawal. There is a need for eliminating the necessity of such peening yet trapping the pawl in the segment. Finally, the pawl 22 in the pending application, and the hole in the bolt in which the pawl 22 is disposed must be machined with mating configured parts to orient the pawl in the proper operative direction. There is a need to eliminate such mating configured parts while retaining the proper orientation of the pawl.

SUMMARY OF THE INVENTION

It is an object of this invention to provide an improved self-retaining adjustable diameter bolt assembly.

It is a further object of this invention to provide an improved self-retaining adjustable diameter bolt assembly having means for retaining the bolt to a panel.

It is still further an object of this invention to provide a self-retaining adjustable diameter bolt assembly having a pawl for holding the bolt of the assembly to a panel while protecting the pawl during tightening of the nut to the bolt.

These and other objects are preferably accomplished by providing a self-retaining adjustable diameter bolt assembly including a bolt having a head, a shank, and a threaded end adapted to be inserted into aligned holes in a pair of abutting panels for subsequent coupling to a nut on the blind side of the panels. The bolt includes a pawl engaging one side of the panels in which the bolt is inserted with the head thereof on the opposite side of the panels. A plurality of bushing segments are mounted on the bolt shank, the pawl extending through an opening in the segment adjacent the threaded end of the bolt shank and retained therein by engagement with a slot through the segment while simultaneously being oriented in an operative position therein. A nut, having a skirt portion, is threaded onto the threaded end driving the segments toward the bolt head and filling the spacing between the hole and bolt shank. The skirt portion of the nut overlies the pawl and protects the same. The nut can be fully torqued to cause complete radial expansion of the bushing segments in the aligned panel holes before bottoming out against the panels.

BRIEF DESCRIPTION OF THE DRAWING

FIG. 1 is an exploded view, partly in section, of an adjustable diameter bolt assembly in accordance with the teachings of the invention;

FIG. 2 is a view taken along lines 2—2 of FIG. 1;

FIG. 3 is a vertical sectional view of a portion of the bolt assembly of FIG. 1;

FIG. 4 is a detailed vertical view of a portion of the bolt assembly of FIG. 1;

FIG. 5 is a view taken along lines 5—5 of FIG. 4;

FIG. 6 is a vertical view, partly in section, showing the bolt assembly of FIG. 1 in assembled condition;

FIG. 9 is a view taken along lines 9—9 of FIG. 3;

FIG. 10 is a vertical detailed view, partly in section, of a portion of the bolt assembly of FIG. 1;

FIG. 11 is a view taken along lines 11—11 of FIG. 10; and

FIG. 12 is a vertical view of a modification of a portion of the apparatus of FIG. 1.

DESCRIPTION OF THE PREFERRED EMBODIMENT

Figure 7:
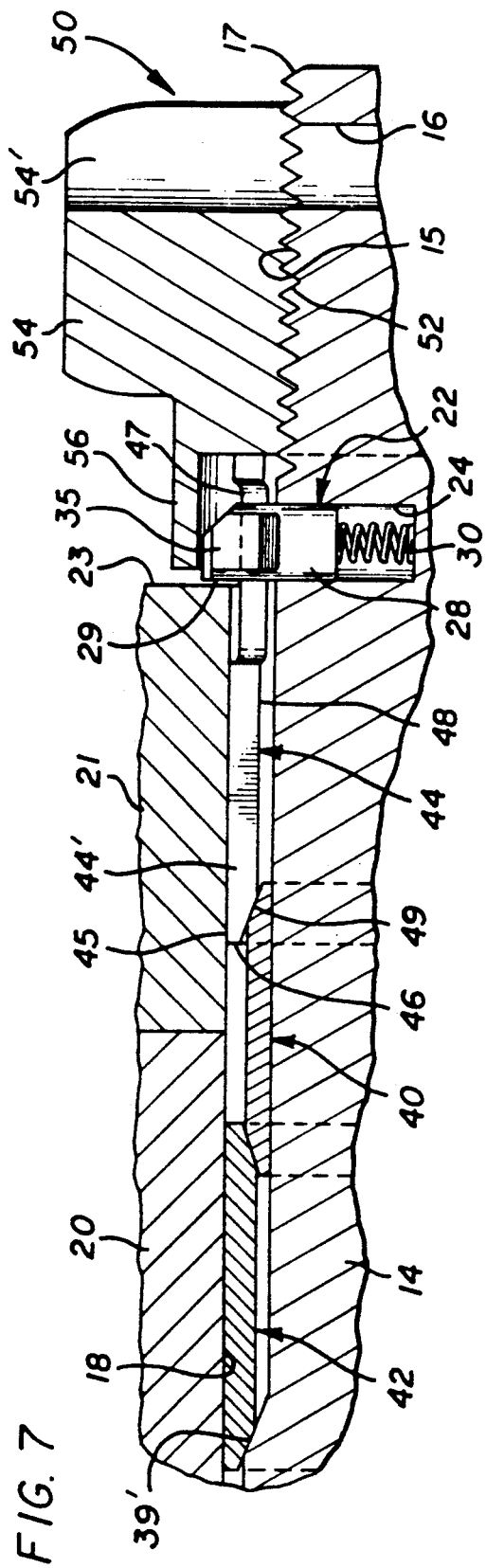
FIG. 7 is a view similar to FIG. 6 showing a further bolt assembly of FIG. 1 in assembled condition.

Referring now to FIG. 1 of the drawing, a bolt assembly 10 is shown comprised of a bolt 11 having an enlarged head 12 which may be slotted, as at slot 13, and hex shaped in outer configuration (FIG. 2). Bolt 11 includes a generally cylindrical shank portion 14 extending from head 12 and an externally threaded end 15. Of course, end 15 may be internally threaded, if desired.

As seen in FIG. 1, a passageway 16 is provided through end 15 for receiving a cotter pin therein, as will be discussed further below. End 15 may be chamfered, as at chamfered nose 17, if desired.

Bolt 11 is adapted to be inserted into aligned apertures 18, 19 (FIG. 6) extending through panel 20, and sub-panel 21, respectively, and be retained therein. A spring biased pawl 22 is provided to retain bushing segments, as will be discussed, on shank portion 14, and abut against face 23 of panel 21 to hold bolt 11 to panels 20, 21, as shown.

A shallow hole 24 or cavity is provided in shank portion 14 adjacent end 15. This hole 24 extends only partway through the shank portion 14. Pawl 22 is shown in FIGS. 3, 4 and 5. As seen in FIGS. 3 and 5, pawl 22 has a lower generally cylindrical body portion 28, an upper body portion 27 (FIG. 4), and a lower central cavity 26 in lower body portion 28. Upper body portion 27 has a forward facing wall portion 29 (see particularly FIGS. 3 and 6). Upper body portion 27 has opposed flats 34, 35 (FIG. 4. The flats 34, 35 of upper body portion 27 may taper at taper 25 to lower body portion 28.

In assembly of pawl 22 in hole 24, pawl 22 is placed in hole 24 with a spring 30 (FIG. 6) mounted in hole 24 entering cavity 26. As will be discussed further hereinbelow, and as seen in FIG. 9, the wall of the slot 47 in bushing segment 44 (see also FIG. 10) traps pawl 22 within hole 24. Pawl 22 is biased upwardly within hole 24 and forward facing wall portion 29 faces in the proper direction for abutting against face 23 as seen in FIG. 6. Thus, wall portion 29 is in a position to abut against face 23 of sub-panel 21 and hold bolt 11 to the panels 21, 22 in a self-retained or hold-out position If it were desired to release bolt 11 from panels 20, 21, detent 22 is merely pushed inwardly in hole 24 against the bias of spring 30 until the upper body portion 27 enters hole 24 a sufficient distance to permit shank portion 14 to be pulled out of aligned holes 18, 19 in panels 20, 21, respectively.

As seen in FIG. 1, bushing means 39, 42, 40 and 44 are provided on bolt 11. Thus, instead of a male bushing segment 39 and optional washer 38, as discussed in my copending application Ser. No. 07/816,654, filed Jan. 3, 1992, a bushing portion 39 is provided integral with bolt head 12. Thus, bushing portion 39 has a generally cylindrical portion 38 integral with head 12, and of a lesser outer diameter than head 12, with an integral tapered portion 39'.

A plurality of bushings, such as three, extend along shank portion 14 between bushing portion 39, and threaded end 15. Such bushings are adjustable bushings well known in the fastener art and generally of the type disclosed in U.S. Pat. No. 3,192,820 to Pitzer except where otherwise indicated. These bushings, when disposed around the shank portion of a bolt, and disposed in a panel hole, such as aligned holes 18, 19 in panels 20, 21 in FIG. 6, swell when torque is applied to fill the spacing in the hole between the bushings and the hole of the walls. Thus, bushing 42 may be a so-called "female" bushing segment which expands into the inside of holes 18, 19. Bushing 40 may be a so-called "male" bushing segment which contracts against the shank portion 14 of bolt 11 and, thus, bridges gaps between structures. Bushing portion 39, at tapered portion 39', is a "male" bushing while end or nose portion 46 of bushing segment 44 is a "female" type bushing. Such bushing segments may also be split or non-split. Segments 40, 42 can be either split or non-split or a combination of both. Segment 44 is a split segment and is shown in detail in FIGS. 10 and 11. Segment 44 has a generally cylindrical main body portion 45 with an integral tapered nose portion 46. An oblong opening 47 extends through the outer wall of main body portion 45 into the interior thereof. As seen in FIGS. 10 and 11, throughbore 48 extends through main body portion 45 coincident with a tapered throughbore 49 through nose portion 46.

As seen in FIG. 3, segment 44 has its nose portion 46 disposed adjacent segment 40. Opening 47 in segment 44 is aligned with hole 24. Thus, pawl 22 protrudes out of opening 47.

As seen in FIG. 11, bushing segment 44 is a half female-type bushing having a split along split 44'. As seen in FIG. 10, split 44' is preferably aligned with slot 47 so as to be able to open segment 44 easily and make the part cheaper and easier to manufacture. Also, uniform expansion and contraction of segment 44 takes place. In assembly of pawl 22 and segment 44, pawl 22 is mounted in hole 24 with spring 30 entering hole 26 therein. A tool (not shown) is inserted into segment 44 opening it along split 44' (that is, opening the split 44' wider) and segment 44 is moved over end 15 with pawl 22 entering slot 47 in segment 44. The tool is now removed and segment 44, due to its inherent resiliency, springs back to the original width of the split opening (split 44') trapping pawl 22 in place within slot 47. The width of slot 47 is such that it traps pawl 22 in position with flats 34, 35 engaging the walls of slot 47 thereby orienting the pawl 22 in the proper operative position as seen in FIG. 9. The spacing between flats 34, 35 thus coincides with the width of slot 47 so that the upper body portion 27 of pawl 22 extends out of slot 47 with the walls of slot 47 serving to retain the pawl 22 in a position whereby face portion 29 faces in the direction shown in FIG. 3. Thus, the need for flats (such as flats 34, 35 in my copending application Ser. No. 07/816,654, filed Jan. 3, 1992 and mating protrusions (such as protrusions 36, 37 in my copending application Ser. No. 07/816,654, filed Jan. 3, 1992 are eliminated along with the necessity of swaging or peening in place (as at peening 31 in the copending application Ser. No. 07/816,654, filed Jan. 3, 1992. Thus, pawl 22 herein is cheaper to manufacture and the need for close tolerances and mating parts between hole 24 and pawl 22 is eliminated.

As particularly contemplated in the present invention, means for driving end bushing segment 44 forward is provided by drive nut 50 (FIG. 1). Nut 50 has a main body portion 51, internally threaded at threads 52, adapted to mate with threaded end 15 of bolt 11. Nut 50 may be a counterbored castellated self-locking nut thereby having a hex-shaped head 54 having a plurality, such as six, of flats 53 and one or more apertures 54, provided through hex head 54 for receiving a cotter pin therein as discussed in U.S. Pat. No. 4,759,671. Nut 50 also has a cylindrical skirt portion 56 of an inner diameter slightly greater than the outer diameter defined by pawl 22, when pawl 22 is in the position shown in FIG. 1.

Thus, nut 50 is adapted to be threaded onto threaded end 15 until skirt portion 56 overlies pawl 22 as seen in FIG. 7. A cotter pin 57 (FIG. 8) can now be inserted through aperture 54, and aligned passageway 16 in threaded end 15. The free ends 58, 59 of pin 57 are then bent to positively lock nut 50 to bolt If it is desired to remove nut 50, pin 57 is withdrawn by merely unbending ends 58, 59 and unthreading nut 50 from portion 15 as heretofore discussed.

Figure 8:
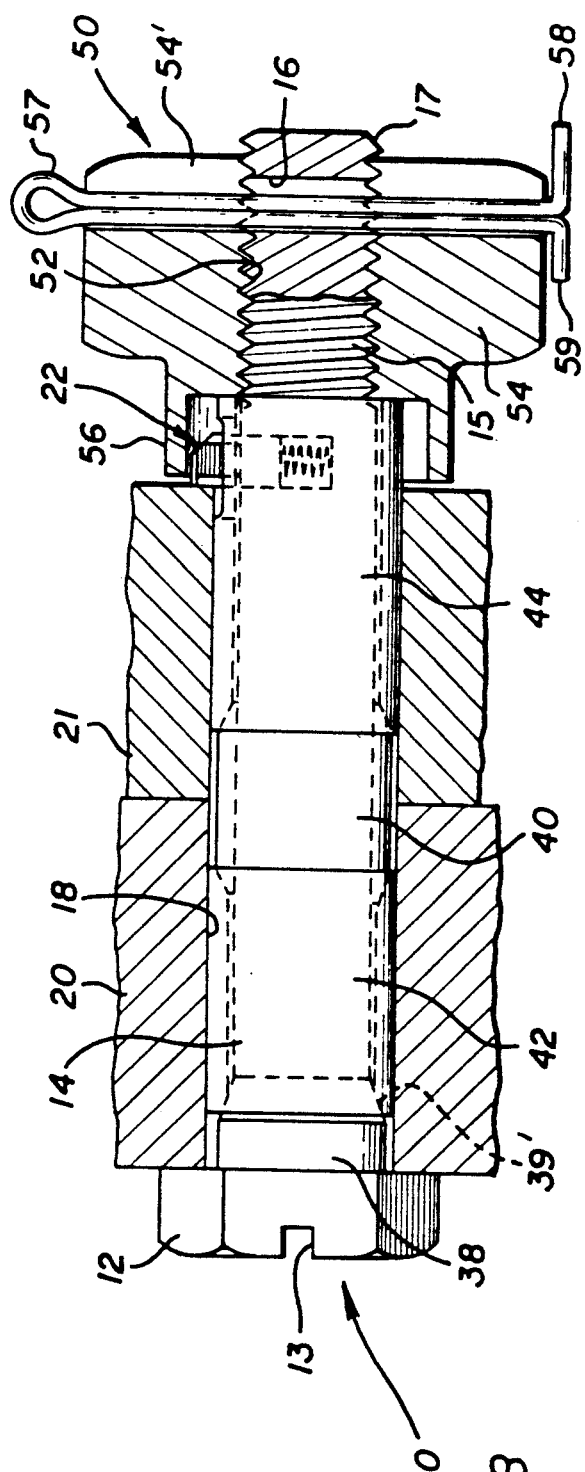
FIG. 8 is a final assembled position in a vertical section of the parts of FIG. 1 with a cotter pin installed thereon.

As seen in FIGS. 7 and 8, when nut 50 is threaded onto threaded end 15 and tightened, driving end bushing segment 44 forward, two things are accomplished. Torque is placed on bushing portions 39, bushing segments 40, 42, and 44. That is, when nut 50 is torqued to the recommended or predetermined torque value, nut 50 causes an axial compression which causes bushing segment 40 to contract against the shank portion 14 of bolt 11 and bridge the gaps between shank portion 14 and the surrounding walls of holes 18, 19 while bushing segments 42, 44 expand in the holes 18, 19 against the surrounding walls thereof. This causes complete hole fill. At the same time, pawl 22 both prevents the bushing segments 40, 42, and 44 from coming off and holds bolt 11 in the hold-out position shown in FIG. 7. Thus, bolt 11 is retained to panels 20, 21 without weakening the bolt 11 while permitting easy release therefrom.

It is important that nut 50 be allowed to achieve the recommended or predetermined torque before nut 50 bottoms out against the application (i.e., face 23 of panel 21). Thus, there will always be a gap between the skirt portion 56 of nut 50 and the face 23 of panel 21 (see FIG. 7).

The second feature accomplished by nut 50 is that skirt portion 56 overlies pawl 22 and protects pawl 22 since it is undesirable to drive pawl 22 downwardly when nut 50 is tightened. Skirt portion 56 thus traps pawl 22 and prevents pawl 22 from coming out.

When the desired torque on nut 50 is reached, cotter pin 57 can be inserted as heretofore discussed. Thus, segment 44 is slotted via oblong opening 47 in a configuration to assure that pawl 22 can move axially therealong. The length of skirt portion 56 is selected so that proper expansion of bushing segments 40, 42, and 44 takes place before the terminal end of skirt portion 56 reaches the panel 21.

As discussed, the length of opening 47 is chosen depending on the amount of stroke required to fully expand all of the bushings 40, 42, and 44.

In conclusion, the fastener 10 is installed, and the installer is able to fully torque the fastener 10 into the installation to cause radial expansion of the bushing segments before the nut 50 bottoms out against the structure of the installation. If the nut 50 bottomed out before being fully torqued, the bushing segments would not be fully expanded and the fastener would not be doing its job.

Pawl 22 can be pushed down against its spring bias only so far such that the upper end is flush with outer surface of the bushing segments so the bushing segments can't move off of the bolt. The bushing segments are preferably of a resilient material, such as spring metal, so as to operate as discussed.

Any suitable materials can be used. Although nut 50 is shown as a single unitary piece, it may be of the type shown in FIGS. 10 and 11 of U.S. Pat. No. 4,759,671. Further, although nut 50 is shown as internally threaded, with bolt end 15 being also externally threaded, as seen in FIG. 12, wherein like numerals refer to like parts of the embodiment of FIGS. 1–11, bolt 11 may terminate at end 60 in an internally threaded cavity 61. Nut 50' may have a threaded shaft 62 adapted to thread into cavity 61, skirt portion 56' extending past end 60 to pawl 22 as heretofore discussed.

It can be seen that there is described an adjustable diameter bolt assembly which fills the application, is self-retaining and positive locking. Radial expansion of the bushing segments to completely fill the installation hole is accomplished before the nut bottoms out against the installation structure. The bolt will remain in place even if the cotter pin comes out or breaks off or if the cotter pin or nut is left off completely or the nut backs off and unthreads during vibration. In addition, the skirt portion of the nut protects the pawl and prevents it from coming out. The skirt portion helps prevent loss of the pawl and controls the amount of movement the pawl would have in an upward motion. The actual location of the skirt portion may vary due to tolerance built up. The assembly is simple to manufacture and assemble and quickly and easily oriented in the proper direction during assembly thereof.

The use of an integral bushing portion 39 on the bolt head eliminates the need for a separate machined bushing segment or optional washer. The split ring segment 44, installed as disclosed, orients the pawl in the proper operative direction while simultaneously eliminating need for peening about the hole in the bolt. Thus, the assembly herein disclosed uses only three bushing segments 42, 40, and 44 rather than the five bushing segments disclosed in copending application Ser. No. 07/816,654, filed Jan. 3, 1992.

What is claimed is:

1. In a self-retaining bolt assembly including a bolt having an enlarged head at one end, a threaded section at the other end and a shank portion between the head and the threaded section, the bolt being adapted to be inserted through aligned apertures in a pair of abutting panels with the head on the access side of said panels, the shank portion including a pawl disposed in a hole in the shank portion movable from a first position into said hole to a second position abutting against the blind side of the panels in which the bolt may be inserted to hold the bolt in a hold-out position with respect to the panels, the pawl being adapted to be disengaged from abutment with the panels whereby the bolt can be removed from the aligned apertures, the threaded section being adapted to be threaded to a nut on the blind side of said panels, the improvement which comprises:

bushing means encircling the shank portion of said bolt, one of said bushing means including a first bushing segment disposed adjacent said threaded section and having a hole therethrough receiving said pawl therethrough and another of said bushing means including a bushing portion adjacent said head integral with said shank portion some of said bushing means comprising male-type bushing means adapted to contract against the shank portion of said bolt when said nut is tightened onto the threaded section of said bolt, and other of said bushing means comprising female-type bushing means adapted to expand outwardly from said shank portion t the walls of said apertures when said nut is tightened onto the threaded section of said bolt; and said nut having a main threaded body portion and a generally cylindrical skirt portion extending toward said threaded section and tightened thereon forcing said one of said bushing means toward said bolt head whereby said bushing means are adapted to fill the spacing between said bolt shank portion and the walls of said aligned apertures.

2. In the assembly of claim 1 wherein at least one of said bushing means is a split ring bushing segment, and at least one of said bushing means is a non-split ring bushing segment.

3. In the assembly of claim 1 wherein the hole through said first bushing segment is oblong and of an overall length determined by the amount of stroke required to fully expand all of said bushing means.

4. In the bolt assembly of claim 3 wherein said pawl has a face portion adapted to abut against one of said panels.

5. In the bolt assembly of claim 3 including orienting means associated with said pawl and said oblong hole for orienting said pawl in a predetermined direction.

6. In the assembly of claim 1 wherein said male-type bushing means and said female-type bushing means are staggered along said shank portion.

7. In the bolt assembly of claim 1 wherein said pawl is spring biased in said pawl hole.

8. In the bolt assembly of claim 1 including an aperture extending through said threaded section, the longitudinal axis of said aperture extending normal to the longitudinal axis of said bolt, said nut being a counterbored castellated self-locking nut threaded onto said threaded section of said bolt providing a plurality of openings for insertion of a cotter pin therethrough and through said aperture thereby positively retaining said nut to said bolt.

9. In the bolt assembly of claim 1 wherein said first bushing segment is a split-ring having a split extending all the way through said segment.

10. In the bolt assembly of claim 9 wherein said hole through said first bushing segment is an oblong hole having said split intersecting said oblong hole on each side thereof.

11. In the bolt assembly of claim 9 wherein said pawl has a lower body portion and an upper body portion, and a pair of opposed flats on said upper body portion, said oblong hole having an oblong shaped wall and said flats engaging said oblong shaped wall of said oblong hole when extending through said oblong hole.

12. in the bolt assembly of claim 11 wherein the lower body portion of said pawl is generally cylindrical.

13. In the bolt assembly of claim 11 wherein said pawl has a face portion on said upper body portion adapted to abut against one of said panels, said flats being disposed on opposite sides of said face portion for orienting said pawl in a direction whereby said face portion faces said one of said panels.

14. In a self-retaining bolt having an enlarged head at one end and a threaded end at the other with a shank portion therebetween, said shank portion including a pawl adapted to extend out beyond the outer surface of said shank portion when in a first position and adapted to extend back into the shank portion of said bolt when in a second position, the shank portion including a hole partway therethrough, the central longitudinal axis of said hole extending in a direction generally normal to the longitudinal axis of said shank portion, said shank portion being free of any longitudinally extending passageway along the interior length thereof, or cross through passage in the area of the pawl, the pawl being disposed in said hole and loosely retained therein, said pawl having a face portion having a plane extending substantially perpendicular to the longitudinal axis of said shank position, spring biasing means in said hole engaging said pawl normally biasing said pawl to a first position wherein said face portion extends out of said hole and movable along an axis generally coincident with the central longitudinal axis of said hole to a second position wherein said face portion is disposed in said hole, and keying means keying said pawl to said bolt so that said pawl is oriented so that its face portion faces the head of said bolt with the plane thereof extending substantially perpendicular to the longitudinal axis of said shank portion, the improvement which comprises:

a plurality of bushing means encircling the shank portion of said bolt, said bushing means including at least one bushing segment disposed adjacent said threaded section and having a hole therethrough receiving said pawl therethrough and another of said bushing means including a bushing portion adjacent said head integral with said shank portion, said bushing means comprising male-type bushing means adapted to contract against the shank portion of said bolt when said nut is tightened onto the threaded section of said bolt, and other of said bushing means comprising female-type bushing means adapted to expand outwardly from said shank portion when said nut is tightened onto the threaded sections of said bolt; and said nut having a main threaded body portion and a generally cylindrical skirt portion extending toward said threaded section and overlying said pawl when said nut is threaded onto said threaded section and tightened thereon forcing said one of said segments toward said bolt head whereby said bushing means are adapted to fill the spacing between said bolt shank portion and the walls of said aligned apertures.

15. In the bolt of claim 14 wherein at least one of said bushing means is a split ring bushing segment, and at least one of said bushing means is a non-split ring bushing segment.

16. In the bolt of claim 14 wherein the hole through said one first bushing segment is oblong and of an overall length determined by the amount of stroke required to fully expand all of said bushing means.

17. In the bolt of claim 15 wherein said male-type bushing means and said female-type bushing means are staggered along said shank portion.

18. In the bolt of claim 14 wherein said first bushing segment is a split-ring having a split extending all the way through said segment.

19. In the bolt of claim 18 wherein said hole through said first bushing segment is an oblong hole having said split intersecting said oblong hole on each side thereof.

20. In the bolt of claim 18 wherein said pawl has a lower body portion and an upper body portion, a pair of opposed flats on said upper body portion, said oblong hole having an oblong shaped wall and said flats engaging said oblong shaped wall of said oblong hole when extending through said oblong hole.

21. In the bolt of claim 20 wherein the lower body portion of said pawl is generally cylindrical.

22. In the bolt of claim 20 wherein said pawl has a face portion on said upper body portion adapted to abut against one of said panels, said flats being disposed on opposite sides of said face portion for orienting said pawl in a direction whereby said face portion faces said one of said panels.

23. An adjustable diameter bolt assembly comprising:
a bolt having an enlarged head at one end; a threaded end at the other end and a shank portion therebetween;
a spring biased pawl mounted in a hole in said shank portion adapted to extend out beyond the outer surface of said shank portion when in a first position and adapted to extend back into the shank portion of said bolt when in a second position;
bushing means encircling the shank portion of said bolt, said bushing means including at least one bushing segment disposed adjacent said threaded section and having a hole therethrough receiving said pawl therethrough, and another of said bushing means including a bushing portion adjacent said head integral with said shank portion, some of said bushing means comprising male-type bushing means adapted to contract against the shank portion of said bolt when said nut is tightened onto the threaded section of said bolt, and other of said bushing means comprising female-type bushing means adapted to expand outwardly from said shank portion when said nut is tightened; and
a nut having a main threaded body portion and a generally cylindrical skirt portion extending toward said threaded section and overlying said pawl when said nut is threaded on said threaded section and tightened thereon forcing at least said one segment toward said bolt head.

24. In the bolt assembly of claim 23 wherein at least one of said bushing means is a split ring bushing segment and at least said one of said bushing means is a non-split ring bushing segment.

25. In the bolt assembly of claim 23 wherein the hole through said first bushing segment is oblong and of an overall length determined by the amount of stroke required to fully expand all of said bushing means.

26. In the bolt assembly of claim 25 wherein said male-type bushing means and said female-type bushing means are staggered along said shank portion.

27. In the bolt assembly of claim 23 wherein said pawl has a face portion thereon, and orienting means associated with said pawl and said at least one bushing segment for orienting the face portion of said pawl in a predetermined direction.

28. In the bolt assembly of claim 23 including an aperture extending through said threaded section, the longitudinal axis of said aperture extending in the same direction as the longitudinal axis of said hole in said shank portion, said nut being a counterbore castellated self-locking nut threaded onto said threaded section of said bolt providing a plurality of openings for insertion of a cotter pin therethrough and through said aperture thereby positively retaining said nut to said bolt.

29. In the bolt assembly of claim 23 wherein said at least one bushing segment is a split-ring having a split extending all the way through said segment.

30. In the bolt assembly of claim 29 wherein said hole through said first at least one bushing segment is an oblong hole having said split intersecting said oblong hole on each side thereof.

31. In the bolt assembly of claim 29 wherein said pawl has a lower body portion and an upper body portion, a pair of opposed flats on said upper body portion, said oblong hole having an oblong shaped wall and said flats engaging said oblong shaped wall of said oblong hole when extending through said oblong hole.

32. In the bolt assembly of claim 31 wherein the lower body portion of said pawl is generally cylindrical.

33. In the bolt assembly of claim 31 wherein said pawl has a face portion on said upper body portion, said flats being disposed on opposite sides of said face portion for orienting said pawl in a predetermined direction.

* * * * *